United States Patent

Dünsbier et al.

(10) Patent No.: US 11,532,450 B2
(45) Date of Patent: Dec. 20, 2022

(54) CONTACTOR FOR AN ELECTRIC VEHICLE

(71) Applicant: AUDI AG, Ingolstadt (DE)

(72) Inventors: Stefan Dünsbier, Regensburg (DE); Stefan Hackner, Greding (DE)

(73) Assignee: AUDI AG, Ingolstadt (DE)

( * ) Notice: Subject to any disclaimer, the term of this patent is extended or adjusted under 35 U.S.C. 154(b) by 462 days.

(21) Appl. No.: 16/593,421

(22) Filed: Oct. 4, 2019

(65) Prior Publication Data

US 2020/0203106 A1 Jun. 25, 2020

(30) Foreign Application Priority Data

Dec. 20, 2018 (DE) .......................... 102018222466.8

(51) Int. Cl.
*H01H 51/10* (2006.01)
*H01H 50/32* (2006.01)
*B60R 16/02* (2006.01)

(52) U.S. Cl.
CPC ........... *H01H 50/321* (2013.01); *B60R 16/02* (2013.01); *B60Y 2200/91* (2013.01); *B60Y 2200/92* (2013.01); *H01H 2239/03* (2013.01)

(58) Field of Classification Search
CPC ...... H01H 50/32; H01H 50/321; H01H 50/54; H01H 50/546; H01H 2239/03; H01H 51/10; H01F 7/124
See application file for complete search history.

(56) References Cited

U.S. PATENT DOCUMENTS 4,092,577 A 5/1978 Markham
4,467,300 A 8/1984 Harbauer
5,300,905 A 4/1994 Kolbas

FOREIGN PATENT DOCUMENTS

| CN | 2259684 Y | 8/1997 |
|---|---|---|
| CN | 1417818 A | 5/2003 |
| CN | 201072734 Y | 6/2008 |
| CN | 204270988 U | 4/2015 |
| CN | 107210163 A | 9/2017 |
| CN | 107408478 A | 11/2017 |
| DE | 10133700 A1 | 1/2003 |
| DE | 102014012454 A1 | 2/2016 |
| DE | 102014117489 A1 | 6/2016 |
| EP | 1876623 A1 | 1/2008 |

OTHER PUBLICATIONS

German Examination Report dated Aug. 16, 2019 in corresponding German Application No. 10 2018 222 466.8; 20 pages.
Chinese Office Action dated Sep. 2, 2021, in connection with corresponding CN Application No. 201911124580.4 (27 pp., including machine-generated English translation).
Chinese Office Action dated Apr. 26, 2022, in connection with corresponding CN Application No. 201911124580.4; 21 pages.

*Primary Examiner* — Ramon M Barrera

(74) *Attorney, Agent, or Firm* — Maier & Maier, PLLC

(57) ABSTRACT

Contactor for an electric vehicle, with at least one fixed contact element and a movable contact element which, in a disconnection position, is spaced from the at least one fixed contact element in order to interrupt an electrical connection of the two contact elements, and which, in a closed position, is in electrically conductive contact with the at least one fixed contact element in order to create an electrical connection of the two contact elements, and with a switch actuator, associated with the movable contact element, which is designed to move the movable contact element into the disconnection position or into the closed position.

11 Claims, 1 Drawing Sheet

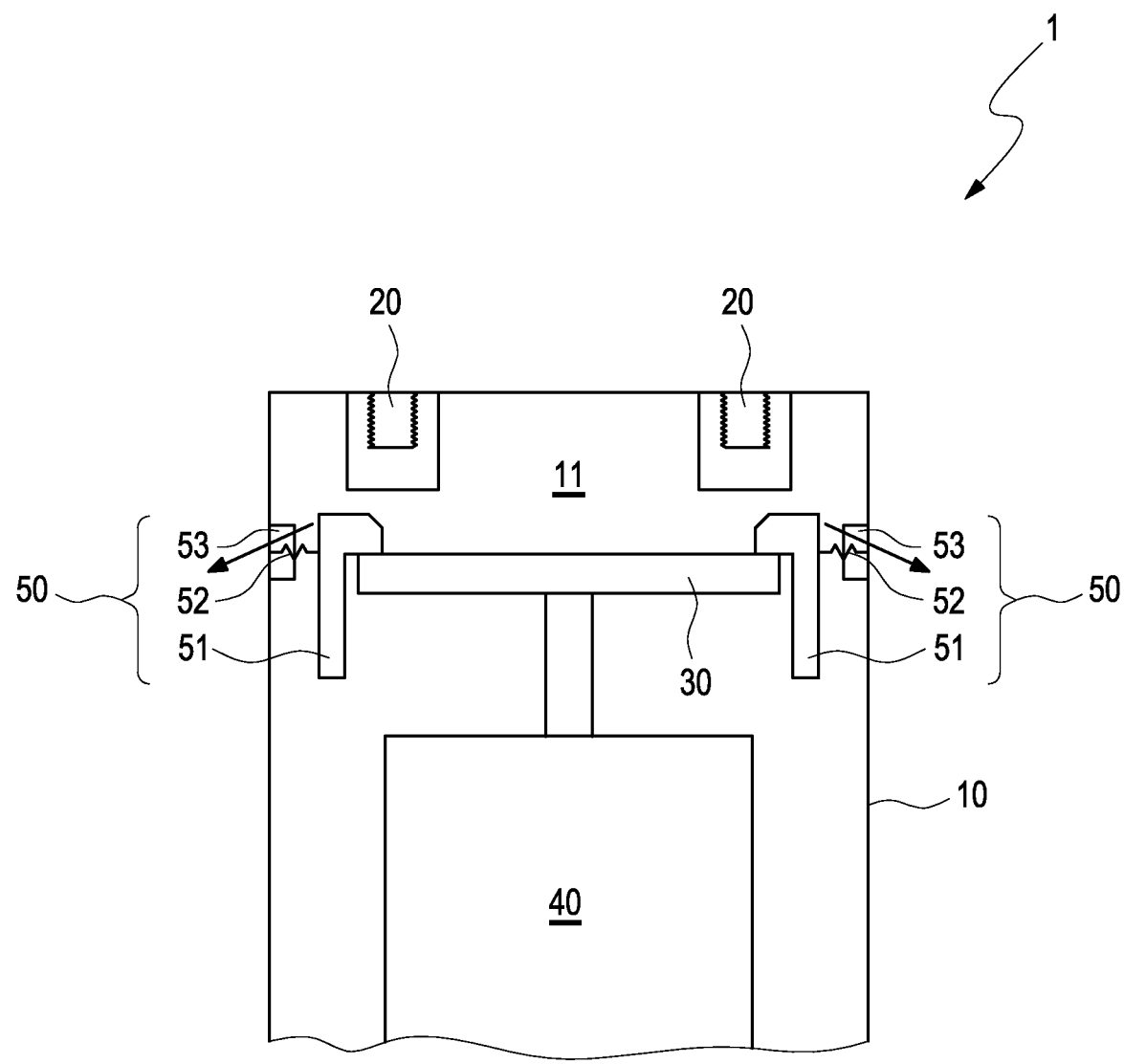

CONTACTOR FOR AN ELECTRIC VEHICLE

FIELD

The disclosure relates to a contactor for an electric vehicle, with at least one fixed contact element and a movable contact element which, in a disconnection position, is spaced from the at least one fixed contact element, in order to interrupt an electrical connection of the two contact elements, and which, in a closed position, is in electrically conductive contact with the at least one fixed contact element, in order to create an electrical connection of the two contact elements, and with a switch actuator, associated with the movable contact element, which is designed to move the movable contact element into the disconnection position or into the closed position.

BACKGROUND

A contactor is an electrically or electromagnetically actuatable switch which is similar to a relay and which is used for switching a large electrical load by means of a relatively very small electric switch current.

Large electric loads have to be switched, for example, in the rail industry. Usually, an electric locomotive, i.e., a locomotive with an electric motor drive system, for changing direction, braking and accelerating, comprises a plurality of contactors which must not be actuated in an arbitrary order. Inadmissible combinations of switch positions of the multiple contactors therefore must be excluded in order to prevent damage to the electric motor drive system of the locomotive due to incorrect actuation by a train driver.

Thus, U.S. Pat. No. 4,092,577 B discloses an electric motor drive system for a locomotive. The drive system comprises one or more electric motors which are in each case arranged in a series connection with a parallel connection which comprises, in a first branch, a drive contactor, and, in a second branch, a series connection with a brake contactor and a brake resistor. Furthermore, the drive system comprises a travel direction lever, an acceleration lever and a brake lever as well as a control device to which the lever is connected in an actuating manner and the contactor in an actuatable manner. The levers are connected to one another via mechanical locking means and the contactors are connected via electrical locking mechanisms mediated by the control device in order to exclude an actuation of the levers and/or contactors which would damage the electric motor drive system.

A common arrangement of electric switches, for example, for use in industrial installations, consists in being able to lock said electric switches in a certain switch position in order to block an incorrect switch position even when the electric switch is actuated.

EP 1 876 623 A1 discloses such a switch in the form of a position switch, for example, for a protection door of an industrial installation. The switch comprises a plurality of fixed contact elements, a corresponding plurality of movable contact elements, and an electromagnetic switch actuator associated with the multiple movable contact elements. The switch actuator is designed and arranged so as to bring the multiple movable contact elements in a closed position into electrically conductive contact with the multiple fixed contact elements in order to create an electrical connection, and, in a disconnection position spaced from the closed position, to disconnect them from the multiple fixed contact elements in order to disconnect the electrical connection from said multiple fixed contact elements. Moreover, the position switch comprises a locking mechanism for locking the switch actuator in the disconnection position.

Furthermore, DE 101 33 700 A1 discloses an electromagnetic switch actuator and a locking mechanism for a switching device which comprises a movable contact element. The switch actuator is arranged and designed to move the movable contact element into a closed position and into a disconnection position spaced from the closed position. The locking mechanism is arranged and designed to mechanically stop the movable contact element in the closed position, and it comprises a pivotable lock element and a lock actuator which is arranged and designed to pivot the lock element on order to stop the movable contact element into a locking position and to release the movable contact into an unlocking position. Unlike in the case of EP 1 876 623 A1, the movable contact element is thus locked here.

Large electric loads also have to be switched in road vehicles driven by an electric motor, i.e., roadworthy vehicles with an electric motor drive system, referred to in short as electric vehicles. Electric vehicles can be designed as hybrid vehicles (Hybrid Electric Vehicle, HEV), plugin hybrid vehicles (Plugin Hybrid Electric Vehicle, PHEV) or as purely electric vehicles (Electric Vehicle, EV, or also Battery Electric Vehicle, BEV).

Electric vehicles are already exposed to strong accelerations, in particular shocks, in the normal driving mode, for example, when driving on poor road surfaces with large potholes. In the case of an accident, the accelerations can be considerably higher, i.e., in the case of a collision of the electric vehicle with another vehicle or a stationary object, for example a tree or a building.

In the case of a strong acceleration, due to a large amount of electric energy stored in a traction battery of the electric vehicle and due to a high operating voltage of the electric motor drive system, for the protection of the electric vehicle and of the vehicle occupants located therein, it must be excluded that a faulty switching of the electric motor drive system occurs.

In order to prevent faulty switching due to strong acceleration, a safety-relevant switching device of the electric motor drive system usually comprises two contactors which are arranged in a series connection and twisted at right angles with respect to one another.

In this manner, the risk of the two contactors changing their switch position simultaneously in the case of a strong acceleration, thus causing a faulty switching, is reduced. However, two contactors are expensive and require twice the installation space, which is disadvantageous since there is usually little space available in an electric vehicle. In addition, the spatially electric series arrangement of two contactors can also not reliably exclude a faulty switching in all cases.

SUMMARY

Therefore, the underlying aim of the invention is to provide an improved contactor which avoids the described disadvantages. Another aim of the invention is to propose an improved electric vehicle.

A subject matter of the present invention is a contactor for an electric vehicle, with at least one fixed contact element and a movable contact element which, in a disconnection position, is spaced from the at least one fixed contact element in order to interrupt an electrical connection of the two contact elements, and which, in a closed position, is in electrically conductive contact with the at least one fixed contact element, in order to create an electrical connection of the two contact elements, and with a switch actuator, associated with the movable contact element, which is designed to move the movable contact into the disconnection position or into the closed position.

The contactor can comprise two electrical connections, one of which is connected in an electrically conductive manner to the fixed contact element and the other to the movable contact element. Alternatively, the contactor can comprise two fixed contact elements which are in each case connected in an electrically conductive manner to an electrical connection. In this case, the movable contact element is designed in the form of a plate in order to create an electrical connection of the two fixed contact elements.

The switch actuator can have an electromagnetic design and comprise a solenoid.

The contactor according to the invention comprises a locking mechanism which is associated with the movable contact element and designed to stop the movable contact element in the disconnection position and in the closed position. In other words, the same locking mechanism can lock the movable contact in each of the two switch positions.

By means of the locking mechanism, it is excluded, on the one hand, that, as a result of a strong acceleration of the contactor, the movable contact element reaches the closed position from the disconnection position. On the other hand, it is also excluded that, as a result of a strong acceleration of the contactor, the movable contact reaches the disconnection position from the closed position. The locking mechanism can have a mechanical, an electromagnetic or another type of design. Any mechanism which is associated with the movable contact element and prevents it from undergoing a strong acceleration when the switch position is changed can be a locking mechanism in the sense of the present invention.

In one embodiment, the movable contact element is in the disconnection position when the switch actuator is inactive and in the closed position when the switch actuator is active. The contactor is normally open when—in the case of an electromagnetic switch actuator—the switch actuator is not energized, and it can be closed by energizing the switch connector. The movable contact element can be biased by a biasing element which is, for example, in the form of a spring, into the disconnection position.

In an alternative embodiment, the movable contact element is in the closed position when the switch actuator is inactive and in the disconnection position when the switch actuator is active. The contactor is normally closed when—in the case of an electromagnetic switch actuator—the switch actuator is not energized, and it can be opened by energizing the switch connector. The movable contact element can be biased by a biasing element which is, for example, in the form of a spring, into the closed position.

In a preferred embodiment, the locking mechanism comprises at least one lock element which is movable between a locking position and an unlocking position and which, in the locking position, stops the movable contact element and, in the unlocking position, releases the movable contact element, and a lock actuator, associated with the at least one lock element, which is designed to move the at least one lock element into the locking position or into the unlocking position. The locking mechanism is based on the fact that the lock element mechanically blocks the movable contact element from leaving the respective switch position, i.e., it impedes in a blocking manner a movement of the movable contact element. In other words, in the locking position, the lock element is in a positive fitting engagement with the contact element. The lock actuator can have an electromagnetic design and comprise a solenoid.

In an additional preferred embodiment, the locking mechanism comprises a biasing element which is associated with the at least one lock element and which biases the at least one lock element into the locking position or into the unlocking position. As a result of the biasing, a resting position of the lock element is defined. The lock actuator thus does not have to be actuated, for example, it does not have to be energized, in order to hold the lock element in the resting position.

The lock element can be in the locking position when the lock actuator is inactive and in the unlocking position when the lock actuator is active. The locking mechanism is normally closed when—in the case of an electromagnetic lock actuator—the lock actuator is not energized, and it can be opened by energizing the lock actuator.

Alternatively, the lock element can be in the unlocking position when the lock actuator is inactive and in the locking position when the lock actuator is active. The locking mechanism is normally open when—in the case of an electromagnetic lock actuator—the lock actuator is not energized, and it can be closed by energizing the lock actuator.

In an additional embodiment, the switch actuator and the lock actuator are synchronously active or inactive. In this manner, controlling the contactor is particularly simple in terms of switching technology.

Advantageously, the contactor comprises a combined switch/lock actuator which comprises the switch actuator and the lock actuator, and in which the switch actuator and the lock actuator are mechanically coupled. As a result of the combined switch/lock actuator, the structure and wiring of the contactor are very simple.

In an alternative embodiment, the lock actuator is active when the switch actuator is inactive, or the lock actuator is inactive when the switch actuator is active. In this way as well, controlling the contactor is very simple in terms of switching technology.

Another subject matter of the invention is an electric vehicle with a contactor according to the invention. As a result of the exclusion of faulty switching of the electric motor drive system due to strong acceleration of the electric vehicle, the electric vehicle offers a high safety level.

An essential advantage of the contactor according to the invention consists in that it makes a doubling of contactors unnecessary and, in addition, the contactor can be arranged in any orientation in the electric vehicle, whereby the installation space is optimally used, the mounting process is simplified and the costs are lowered. At the same time, a dangerous changing of the switch position of the movable contact element is excluded, which is associated with a high safety level for the electric vehicle.

BRIEF DESCRIPTION OF AN EXEMPLARY EMBODIMENT OF THE DRAWINGS

The invention is represented diagrammatically by means of embodiments in the drawings and described in further detail in reference to the drawings. It shows:

FIG. 1 in a diagrammatic representation, a partial side view of a contactor according to an embodiment of the present invention.

DETAILED DESCRIPTION

FIG. 1 shows, in a diagrammatic representation, a partial side view of a contactor 1 according to an embodiment of the present invention. The contactor 1 is provided for an electric vehicle and can be installed in an electric drive system of an electric vehicle. The person skilled in the art is aware that the contactor 1 can also be used for other vehicles which are exposed to strong accelerations, in particular road vehicles driven by combustion engines or rail vehicles.

The contactor 1 comprises a housing 10 which defines in its interior a switch space 11. Furthermore, the contactor 1 comprises two fixed contact elements 20 and a movable contact element 30, which are arranged in the switch space 11. The movable contact element 30 is designed in the form of a plate and, in a disconnection position, it is spaced from the two fixed contact elements 20 in order to interrupt an electrical connection of the two contact elements 20, 30 and, in a closed position in electrically conductive contact with the two fixed contact elements 20, to create an electrical connection of the two contact elements 20, 30.

Moreover, the contactor 1 comprises an electromagnetic switch actuator 40, associated with the movable contact element 30, with a solenoid which is not represented. The switch actuator 40 is arranged and designed to move the movable contact element 30 into the disconnection position or into the closed position.

The movable contact element 30 is in the disconnection position when the switch actuator 40 is inactive and in the closed position when the switch actuator 40 is active. In alternative embodiments, the movable contact element 30 is in the closed position when the switch actuator 40 is inactive and in the disconnection position when the switch actuator 40 is active.

The contactor 1 moreover comprises a locking mechanism 50 which is associated with the movable contact element 30 and designed to stop the movable contact element 30 in the disconnection position and in the closed position.

The locking mechanism 50 comprises two movable L-shaped lock elements 51 which are movable between a locking position and an unlocking position, and which have a pivot arm and a blocking arm protruding perpendicularly from the pivot arm. The lock elements 51 stop the movable contact element 30 in the locking position and release the movable contact element 30 in the unlocking position. In the figure, the lock elements 51 are depicted in the locking position. The movable contact element 30 is shown under the blocking arms, stopped in the disconnection position. On the other hand, when stopped in the closed position, the movable contact element 30 would be arranged above the blocking arms and stopped.

The locking mechanism 50 moreover comprises two electromagnetic lock actuators 53, associated with the lock elements 51, in each case with a solenoid which is designed to move the two lock elements 51 into the unlocking position, and two biasing elements 52 supported on the housing 10, which are associated with the two lock elements 51 in each case and bias the two lock elements 51 into the locking position.

In other embodiments, the lock actuators 53 are alternatively designed to move the two lock elements 51 into the locking position, and the two biasing elements 52 bias the two lock elements 51 into the unlocking position. Other embodiments comprise a single lock element 51 or more than two lock elements 51 and/or they comprise a single lock actuator 53 or more than two lock actuators 53.

The lock elements 51 are in the locking position when the lock actuator 53 is inactive and in the unlocking position when the lock actuator 53 is active. Alternatively, the lock elements 51 can be in the unlocking position when the lock actuator 53 is inactive and in the locking position when the lock actuator 53 is active.

In the contactor 1, the switch actuator 40 and the lock actuator 53 are synchronously active or inactive. For example, the locking mechanism 50 can comprise a combined switch/lock actuator which comprises the switch actuator 40 and the lock actuator 53 and/or in which the switch actuator 40 and the lock actuator 53 are mechanically coupled.

In another embodiment, alternatively the lock actuator 53 can be active when the switch actuator 40 is inactive or the switch actuator 53 can be inactive when the switch actuator 40 is active.

The invention claimed is:

1. A contactor for an electric vehicle, comprising:
    at least one fixed contact element and a movable contact element which, in a disconnection position, is spaced from the at least one fixed contact element, in order to interrupt an electrical connection of the two contact elements, and which, in a closed position, is in electrically conductive contact with the at least one fixed contact element, in order to create an electrical connection of the two contact elements, and
    a combined locking mechanism and switch actuator, comprising at least two lock actuators, each lock actuator being mechanically coupled to a switch actuator such that an actuation of the switch actuator also actuates the locking actuators, the switch actuator associated with the movable contact element, wherein the switch actuator is designed to move the movable contact element into the disconnection position or into the closed position, and designed to stop the movable contact element in the disconnection position and in the closed position, wherein the locking mechanism releases at least two lock elements movable via the two lock actuators, wherein each lock element is movable via one of the lock actuators between a locking position and an unlocking position and which, in the locking position, stops the movable contact element and, in the unlocking position, releases the movable contact element.

2. The contactor according to claim 1, in which the movable contact element is in the disconnection position when the switch actuator is inactive and in the closed position when the switch actuator is active.

3. The contactor according to claim 1, in which the movable contact element is in the closed position when the switch actuator is inactive and in the disconnection position when the switch actuator is active.

4. The contactor according to claim 1, in which the locking mechanism comprises a biasing element which is associated with the at least one lock element and which biases the at least one lock element into the locking position or into the unlocking position.

5. The contactor according to claim 1, in which the lock element is in the locking position when the lock actuator is inactive and in the unlocking position when the lock actuator is active, or in which the lock element is in the unlocking position when the lock actuator is inactive and in the locking position when the lock actuator is active.

6. The contactor according to claim 4, in which the lock actuator is active when the switch actuator is inactive, or the lock actuator is inactive when the switch actuator is active.

7. The contactor according to claim 4, in which the lock element is in the locking position when the lock actuator is inactive and in the unlocking position when the lock actuator is active, or in which the lock element is in the unlocking position when the lock actuator is inactive and in the locking position when the lock actuator is active.

8. The contactor according to claim 4, in which the switch actuator and the lock actuator are synchronously active or inactive.

9. The contactor according to claim 5, in which the switch actuator and the lock actuator are synchronously active or inactive.

10. The contactor according to claim 4, in which the lock actuator is active when the switch actuator is inactive, or the lock actuator is inactive when the switch actuator is active.

11. The contactor according to claim 5, in which the lock actuator is active when the switch actuator is inactive, or the lock actuator is inactive when the switch actuator is active.

* * * * *